United States Patent [19]
Lee et al.

[11] Patent Number: 5,871,655
[45] Date of Patent: Feb. 16, 1999

[54] INTEGRATED CONDUCTOR MAGNETIC RECORDING HEAD AND SUSPENSION HAVING CROSS-OVER INTEGRATED CIRCUITS FOR NOISE REDUCTION

[75] Inventors: Edward Hin Pong Lee; Randall George Simmons, both of San Jose, Calif.

[73] Assignee: International Business Machines Corporation, Armonk, N.Y.

[21] Appl. No.: 44,491

[22] Filed: Mar. 19, 1998

[51] Int. Cl.[6] .................................................. G11B 5/235
[52] U.S. Cl. ........................................... 216/22; 29/603.16
[58] Field of Search ........................ 216/2, 22; 360/119; 357/23.7; 29/603.16

[56] References Cited

U.S. PATENT DOCUMENTS

| | | | |
|---|---|---|---|
| 3,757,028 | 9/1973 | Schlessel | 174/33 |
| 3,761,842 | 9/1973 | Gandrud | 333/1 |
| 3,764,727 | 10/1973 | Balde | 174/34 |
| 4,195,323 | 3/1980 | Lee | 360/113 |
| 4,321,641 | 3/1982 | Lee | 360/126 |
| 4,639,289 | 1/1987 | Lazzari | 156/643 |
| 4,698,708 | 10/1987 | Lazzari | 360/103 |
| 4,809,103 | 2/1989 | Lazzari | 360/103 |
| 4,856,181 | 8/1989 | Pichler | 29/603 |
| 4,949,207 | 8/1990 | Lazzari | 360/119 |
| 4,992,897 | 2/1991 | Deroux-Dauphin | 360/103 |
| 5,039,824 | 8/1991 | Takashima et al. | 174/33 |
| 5,041,932 | 8/1991 | Hamilton | 360/104 |
| 5,059,278 | 10/1991 | Cohen | 156/643 |
| 5,095,613 | 3/1992 | Hussinger et al. | 29/603 |
| 5,111,351 | 5/1992 | Hamilton | 360/104 |
| 5,163,218 | 11/1992 | Hamilton | 29/603 |
| 5,166,845 | 11/1992 | Thompson et al. | 360/103 |
| 5,228,184 | 7/1993 | Kishi | 29/603 |
| 5,357,050 | 10/1994 | Baran et al. | 174/33 |
| 5,389,735 | 2/1995 | Bockelman | 174/33 |
| 5,397,862 | 3/1995 | Bockelman et al. | 174/250 |
| 5,408,373 | 4/1995 | Bajorek et al. | 360/104 |
| 5,430,247 | 7/1995 | Bockelman | 174/33 |
| 5,483,025 | 1/1996 | Hamilton et al. | 174/254 |
| 5,745,979 | 5/1998 | Fontana, Jr. et al. | 29/603.12 |

*Primary Examiner*—R. Bruce Breneman
*Assistant Examiner*—Alva C. Powell
*Attorney, Agent, or Firm*—Noreen A. Krall

[57] ABSTRACT

The present invention is an integral magnetic head suspension and method for making the same. The integral suspension, with or without the head, contains integrated conductive circuits that have multiple cross overs for noise reduction. The suspension is fabricated completely on silicon (Si) wafers using semiconductor processes. A N+ silicon layer is disposed over a P− silicon wafer. The N+ silicon layer and the P− silicon water are thermally oxidized to generate a bottom silicon oxide layer opposite the N+ layer side of the wafer and a top silicon oxide layer on the N+ side of the wafer, and to drive the N+ silicon into the P− silicon wafer. A layer of polysilicon is disposed over the silicon oxide layer on top of the N+ silicon layer. One or more pairs of conductive traces having multiple cross-overs are fabricated on the layer of polysilicon. Optimally, a magnetic head is simultaneously fabricated on the suspension. The polysilicon layer is then patterned to define the head structure and suspension structure as one piece. Finally, the magnetic head and suspension are separated from the wafer by removing the first silicon oxide layer by a chemical etchant and the P− silicon wafer by selective etching. The head and suspension are released from the silicon wafer as a single structure using the above-described semiconductor processes. Accordingly, no grinding or cutting is used to define the dimensions of the head. Further, no processes are required to attach the head to the suspension and the suspension can be made from low mass materials such as silicon (Si) or $Al_2O_3$.

23 Claims, 13 Drawing Sheets

INTEGRATED CONDUCTOR MAGNETIC RECORDING HEAD AND SUSPENSION HAVING CROSS-OVER INTEGRATED CIRCUITS FOR NOISE REDUCTION

BACKGROUND OF THE INVENTION

1. Field of the Invention

This invention relates in general to integral recording head suspensions, and more particularly, to a low noise integrated conductor magnetic recording head suspension fabricated as one single structure using semiconductor processes and a method for making the same.

2. Description of Related Art

Moving magnetic storage devices, especially magnetic disk drives, are the memory device of choice. This is due to their expanded non-volatile memory storage capability together with a relatively low cost. Accurate retrieval of the stored information from these devices becomes critical, requiring the magnetic transducer to be positioned as close to the storage media as possible. Optimally, the transducer may actually contact the media.

Magnetic disk drives are information storage devices which utilize at least one rotatable magnetic media disk having concentric data tracks defined for storing data, a read/write transducer for reading data from and/or writing data to the various data tracks, a slider for supporting the transducer adjacent the data tracks typically in a flying mode above the storage media, a suspension assembly for resiliently supporting the slider and the transducer over the data tracks, and a positioning actuator coupled to the transducer/slider/suspension combination for moving the transducer across the media to the desired data track and maintaining the transducer over the data track center line during a read or a write operation. The transducer is attached to or is formed integrally with the slider which supports the transducer above the data surface of the storage disk by a cushion of air, referred to as an air bearing, generated by the rotating disk.

Alternatively, the transducer may operate in contact with the surface of the disk. Thus the suspension provides desired slider loading and dimensional stability between the slider and an actuator arm which couples the transducer/slider/suspension assembly to the actuator. The suspension is required to maintain the transducer and the slider adjacent the data surface of the disk with as low a loading force as possible. The actuator positions the transducer over the correct track according to the data desired on a read operation or to the correct track for placement of the data during a write operation. The actuator is controlled to position the transducer over the desired data track by shifting the combination assembly across the surface of the disk in a direction generally transverse to the data tracks.

The development of thin film magnetic recording heads and suspensions have become the subject of increased interest, especially in the area of high speed, high density recording and retrieval of digital computer information on magnetic media.

Conventional thin film magnetic recording heads are produced using suitable material know in the art such as alumina-titanium-carbide (AlTiC) or silicon for example, and are suspended on stainless steel flexures using physical and mechanical methods. Twisted pairs of copper wire or parallel, single-layer integrated circuits, often referred to as copper traces, are used to electrically connect the magnetic recording head to the recording channel.

Known methods for fabricating single-layer integrated circuits on suspensions typically consist of sequentially depositing thin film layers of conductive, and insulative materials on a rigid substrate. The delineated layer of conductive thin films provides electrical interconnection between the heads and the power supply/addressing network which is used to activate the drive. Finally, insulator thin film layers (polyimides, $SiO_2$) are used to electrically isolate the various thin film conductor layers. The various thin film layers are typically deposited by a variety of techniques including vacuum deposition (sputtering, evaporation), electroplating, and spin-coating (e.g., for spin-on insulator materials).

Although it is known that twisted pairs of copper wire will suppress common mode noise, electrostatic and magnetic, by approximately 30 to 40 db, the current integrated circuit suspension designs do not permit cross-over of the integrated copper circuits or traces for noise reduction. The resulting integrated head/suspension assemblies are subjected to undesirable common mode noise.

Furthermore, conventional heads also require attachment to the suspensions and the wires for electrical contact must be bonded to the head assembly. These processes increase the size of the head/suspension assembly as well as contribute significantly to the cost.

It can be seen then that there is a need for a low noise magnetic recording head suspension fabricated as one single structure using semiconductor processes.

It can also be seen that there is a need for a low noise, low mass-recording head and suspension fabricated as one single structure using the semiconductor processes.

SUMMARY OF THE INVENTION

To overcome the limitations in the prior art described above, and to overcome other limitations that will become apparent upon reading and understanding the present specification, the present invention discloses a low noise, low mass magnetic recording head suspension and method for making the same.

The present invention solves the above-described problems by providing a low noise magnetic head suspension, fabricated with or without the magnetic recording head, which is fabricated completely on silicon (Si) wafers using semiconductor processes. The suspension is released from the silicon wafer as a single structure using semiconductor processes. No grinding or cutting is used to define the dimensions of the head suspension. No processes are required to attach the head to the suspension if the head and suspension are fabricated as a single structure. The suspension contains integrated conductive circuits that have multiple cross-overs of the conductive traces for noise reduction. The suspension can be made from low mass materials such as silicon (Si) or $Al_2O_3$.

A system in accordance with the principles of the present invention comprises a P− silicon wafer having a N+ silicon layer disposed over the P− silicon wafer. The N+ silicon layer and the P− silicon wafer are thermally oxidized to generate a first silicon layer opposite the N+ layer side of the wafer and a second silicon oxide layer on the N+ side of the wafer, and to drive the N+ silicon into the P−silicon wafer. A layer of polysilicon may be disposed over the silicon oxide layer on top of the N+ silicon layer using, for example, a highly conductive media such as silicide. The polysilicon is then patterned to define suspension structure. Optionally, the polysilicon is patterned such that the magnetic recording head is disposed on the polysilicon, if the suspension is to be fabricated as one-piece with the magnetic head. Next, the integrated conductive circuit structure having multiple cross-overs is fabricated by first depositing a seed layer on the polysilicon. A photoresist is then applied over the seed layer. The photoresist is exposed and developed to define the geometry of the conductive traces. The geometrically defined conductive traces are then electroplated with a conductive material, such as copper or gold, to the desired thickness. Alternatively, the traces may be sputter deposited with lift off. The seed layer is then removed. An insulating layer is applied over the first conductive trace at selected points where the traces will cross, and the process is repeated. A seed layer is deposited over the polysilicon having the first conductive trace formed thereon. Next, a photoresist is applied over the seed layer. The photoresist is exposed and developed to define the geometry of the second conductive trace, which crosses the first conductive trace. The geometrically defined second conductive trace is then electroplated with a conductive material, such as copper or gold, to the desired thickness. The seed layer is then removed. If a protective layer is required, then a $SiO_2$ is deposited over the crossing traces. Finally, the suspension, having the integrated traces thereon, is separated from the wafer by removing the first silicon oxide layer by a chemical etchant and the P– silicon wafer by selective etching.

In an alternative embodiment, the low noise magnetic head suspension is fabricated as a unitary piece together with the magnetic recording head. In this embodiment, the magnetic head is fabricated over the polysilicon layer using semiconductor fabrication techniques. At the same time the coils are formed in the magnetic head, the conductive traces having multiple cross-overs are formed on the suspension. At first coil formation, a first conductive trace is patterned on the polysilicon layer of the suspension. The conductive trace extends the length of the suspension in a zig-zagging fashion. The conductive trace is suitable on one end for connection to the magnetic head and on the other end for connection to the arm electronics termination pads. Next, as the second coil is formed in the magnetic head, a second conductive trace is formed along the length of the suspension. The second conductive trace, like the first conductive trace, is formed in a zig-zag pattern opposite that of the first conductive trace such that the first and second conductive traces cross at points along the length of the suspension. In accordance with this alternative approach, no additional steps are necessary to form the conductive lead lines which connect the magnetic recording head with the arm electronics. No additional processes are required to form the conductive traces on the surface of the suspension.

Although the crossing conductive traces of the present invention have been described as being fabricated completely on Silicon wafers, it is understood that the traces may be formed on a head suspension assembly such as that defined in U.S. Pat. No. 5,408,373 of Bajorek et al., which utilizes an organic release layer. The conductive traces in accordance with the present invention may also be formed on a suspension such as that described in U.S. Pat. No. 5,483,025 issued to Hamilton et al which utilizes a copper release layer and copper walls to define the slope of the head and suspension.

One aspect of the present invention is that a low noise magnetic head suspension is fabricated using semiconductor processes thereby eliminating undesirable cross-talk encountered between parallel traces in prior art integrated circuit suspensions.

Another aspect of the present invention is that a low noise magnetic head and suspension may be fabricated as one single structure using semiconductor processes thereby eliminating the head-attachment process.

Another aspect of the present invention is that the conductive traces may be formed on the suspension at the same time the electric coils are formed in the magnetic lead, thus eliminating additional processes for attaching conductive lead lines.

Another aspect of the present invention is that a low noise integral magnetic head and suspension is fabricated with substantially reduced size and mass.

Another aspect of the present invention is that the head and suspensions are reduced in size since mechanical processes are eliminated, and traces which are defined by microlithographic techniques permit reduced size, optimal performance and multiple trace capability.

Another aspect of the present invention is that the integral head and suspension exhibit increased reliability since chipping and cracking from the cutting process are eliminated.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there is illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF THE INVENTION

In the following description of the preferred embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

The present invention provides a low noise, low mass magnetic head suspension fabricated completely on silicon (Si) wafers using semiconductor processes. The suspension is released from the silicon wafer as a single structure using semiconductor processes. Optionally, the suspension with an integral magnetic head are released from the silicon wafer as a single structure using semiconductor process. No grinding or cutting is used to define the dimensions of the suspension. No processes are required to attach the head to the suspension. The suspension can be made from low mass materials such as silicon (Si) or $Al_2O_3$.

Figure 1:
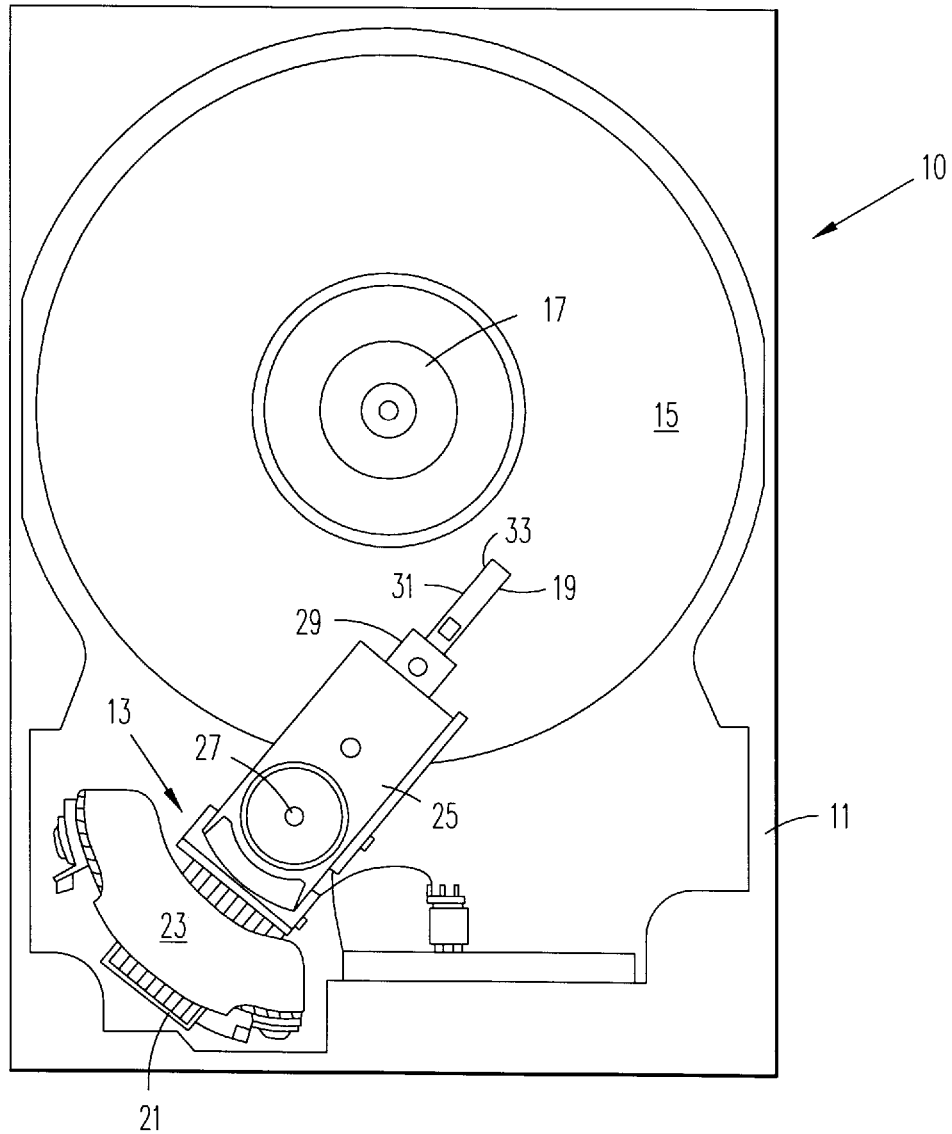
FIG. 1 illustrates a magnetic storage system according to the present invention.

FIG. 1 illustrates a magnetic storage system 10 including a housing 11 in which is mounted a rotary actuator 13, one or more associated magnetic storage disks 15 mounted on a spindle 17 and a drive means (not shown) coupled to a spindle 17 for rotating the disk 15. The rotary actuator 13 moves an integrated transducer/suspension assembly 19 in accordance with the present invention in an arcuate path across the surface of the storage disk 15. The rotary actuator 13 includes a voice coil motor comprising a coil 21 movable within the magnetic field of a fixed permanent magnetic assembly 23. An actuator arm 25 having the moving coil 21 formed on one end thereof is pivotably mounted on pivot post 27. A support arm 29 is attached to the other end of the actuator arm 25 and projects across the surface of the disk 15. The support arm 29 supports the integrated transducer/slider/suspension assembly 19 produced according to the procedure set forth herein in cantilever fashion over the surface of the disk 15.

Figure 2:
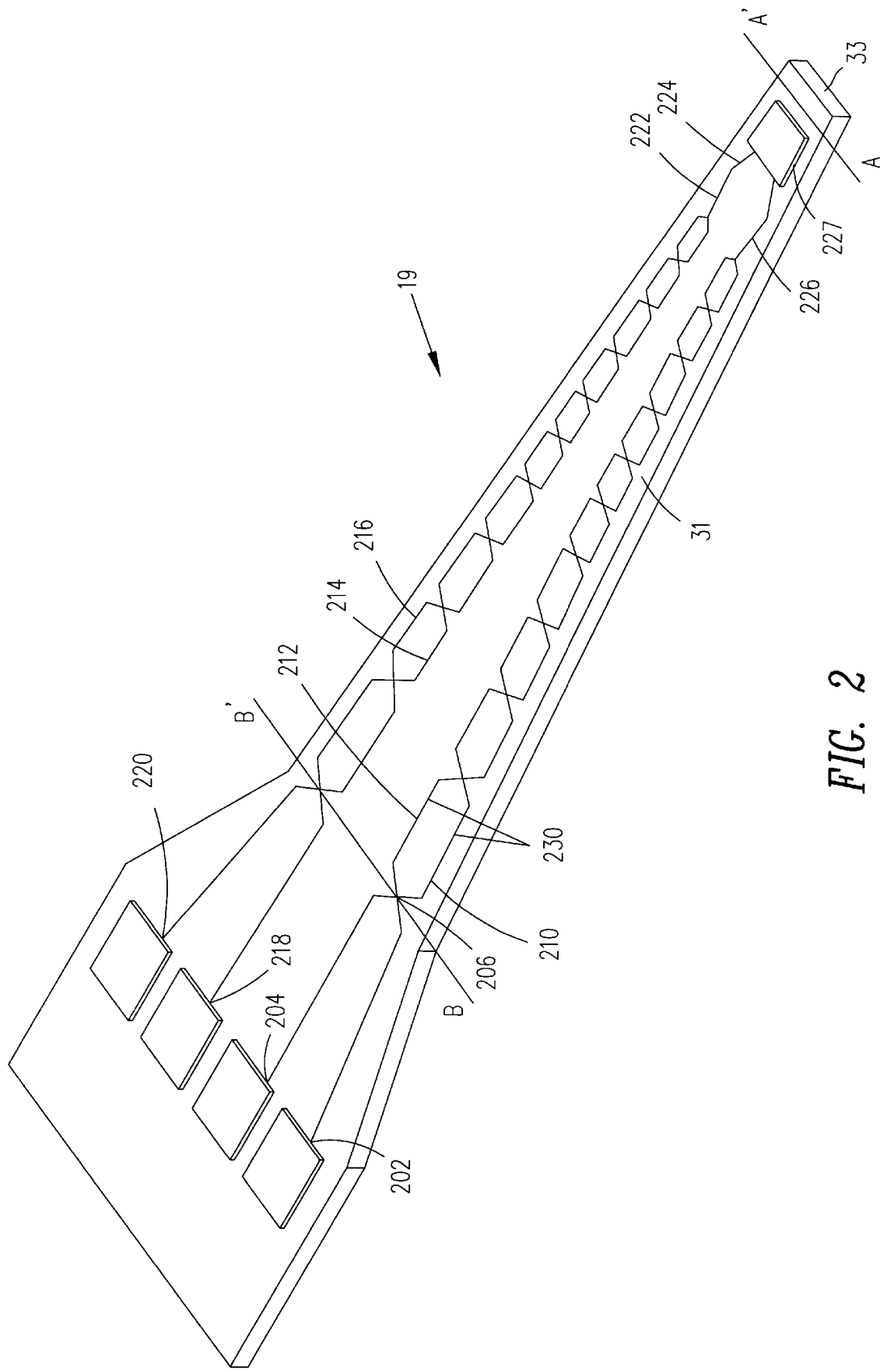
FIG. 2 illustrates an integrated assembly that includes a suspension section and an optional transducer/slider formed at one end integral with the suspension section.

FIG. 2 illustrates an integrated assembly 19 that includes a suspension section 31 and a transducer/slider 33 formed at one end integral with the suspension section 31. The suspension section 31 supports the transducer/slider 33 above the surface of the disk 15 on a bearing or cushion of air generated by the rotation of the disk 15.

It is seen that the transducer leads include pairs of two conductive traces 210, 212, 214, 216. Conductor ends or terminals 202, 204, 218, 220 define the port for connection to the disk drive controlling electronics, and conductor ends or terminals 222, 224, 226, 227 define the port connecting to the magnetic head 33. Considering momentarily only one of the conductive pairs, it is seen that the pairs are comprised of a first conductive trace 210 and a second conductive trace 212, which are sectionable into conductive un-twisted segments 230, and successive conductive twisted segments 206. The conductive traces 210, 212 are substantially parallel for a certain length during each untwisted segment 230. The conductive traces 210, 212 then cross over one another with overlaid intersecting slanting portions or segments to form an X-shaped cross section 206. The lengths at which the cross 206 occurs is preferably small relative to the length of the parallel section 230.

Figure 3A:
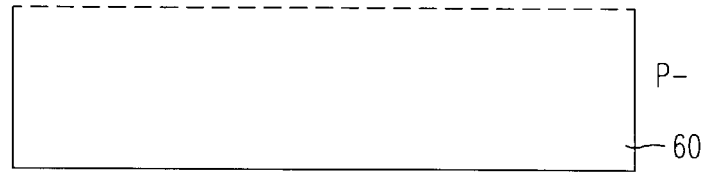
FIGS. 3a–d illustrate the suspension forming process steps for an integral head and suspension according to the present invention.
Figure 3B:
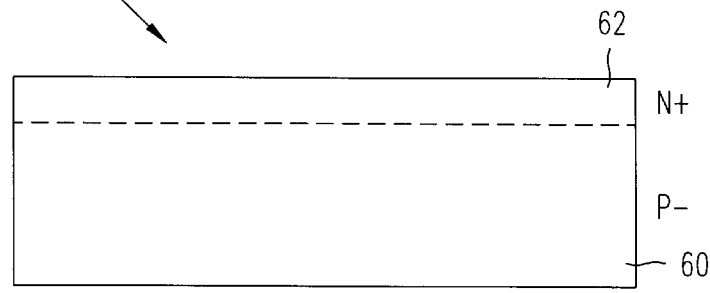
Figure 3C:
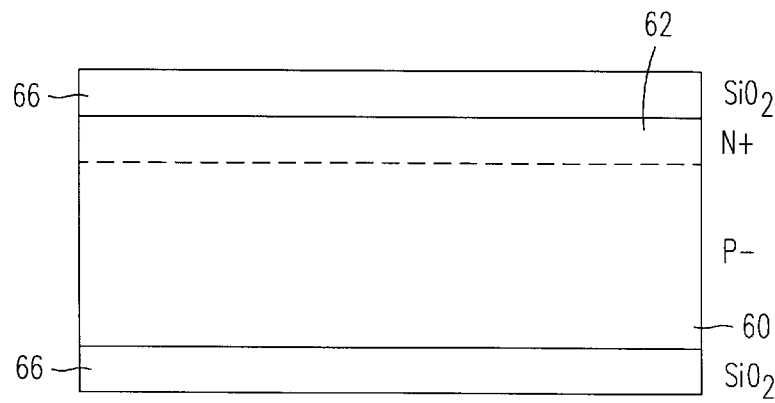

Now referring to FIGS. 3a–d, the process for producing an integral head suspension according to the present invention is explained. FIG. 3a illustrates a P– silicon wafer 60. The P– silicon wafer 60 is doped with N+ 62 by ion implantation or out-diffusion of a doped glass as illustrated in FIG. 3b, thereby resulting in a doped silicon wafer 64. The doped silicon wafer 64 is then thermally oxidized to generate a silicon oxide layer 66 on both sides of the wafer 64 and to drive N+ dopant 62 into the wafer to the desired thickness of the suspension. Alternatively, the wafer 64 may be annealed after oxidation. The resulting oxidized structure 66 is shown in FIG. 3c.

Figure 3D:
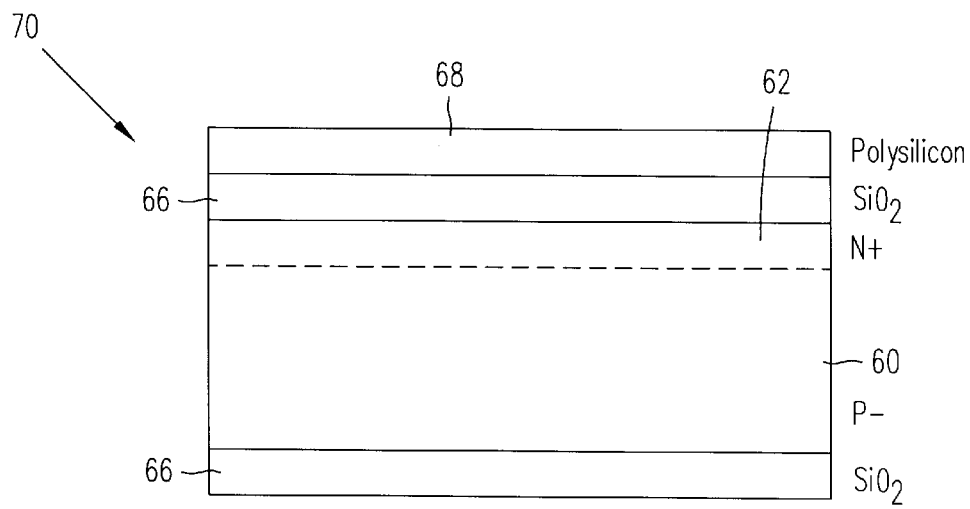

Polysilicon, doped polysilicon or a silicide layer 68 of about 1 um thickness is deposited over the silicon oxide layer 66 using low pressure chemical vapor deposition (LPCVD), chemical vapor deposition (CVD) or other similar semiconductor deposition processes. For clarity, only the term polysilicon will be used herein. However, those skilled in the art will recognize that doped polysilicon or a silicide layer could be substituted wherever the term polysilicon is used. The polysilicon 68 is patterned using photoresist and a chemical etchant or reactive ion etching to define head structure and suspension structure as one piece or as separate pieces, and for contact to holes and leads. FIG. 3d. shows the cross sectional view of the completed wafer 70 and its layers.

Optionally, if fabricating a suspension with the recording head as a single structure, the magnetic head is then constructed over the polysilicon layer using known semiconductor fabrication techniques. One such example of a process for producing a magnetic head is disclosed in U.S. Pat. Nos. 4,837,924, entitled PROCESS FOR THE PRODUCTION OF PLANAR STRUCTURE THIN FILM MAGNETIC HEADS, and 4,949,207, entitled PLANAR STRUCTURE THIN FILM MAGNETIC HEAD, both of which are issued to Jean-Pierre Lazzari and assigned to Commissariat a I'Energie Atomique, and both of which are incorporated herein by reference. For purposes of illustration only, the production of a magnetic head as disclosed by Lazzari will be described. However, those skilled in the art will recognize that other processes for fabricating a magnetic head using semiconductor technology could be used. Further, Lazzari discloses a process for producing a horizontal magnetic head. However, it is to be understood that the present invention is not meant to be limited to an integral suspension and horizontal magnetic head.

FIG. 4 shows the main stages of the magnetic head fabrication process as disclosed by Lazzari. On the polysilicon layer 68 of FIG. 3d, a silicon dioxide layer 111 is deposited or grown and thereon is formed a first insulating film 112 (e.g. of silicon oxide). In the following figures, only the fabrication of the magnetic head will be illustrated and the polysilicon layer will not be shown.

Figure 4A:
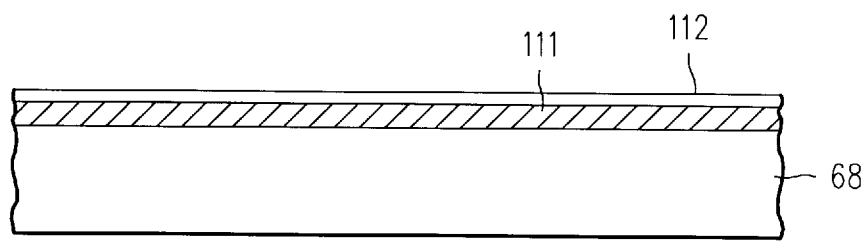
FIGS. 4a–m illustrate one embodiment of a prior art magnetic head fabrication process for an integral head and suspension according to the present invention.
Figure 4B:
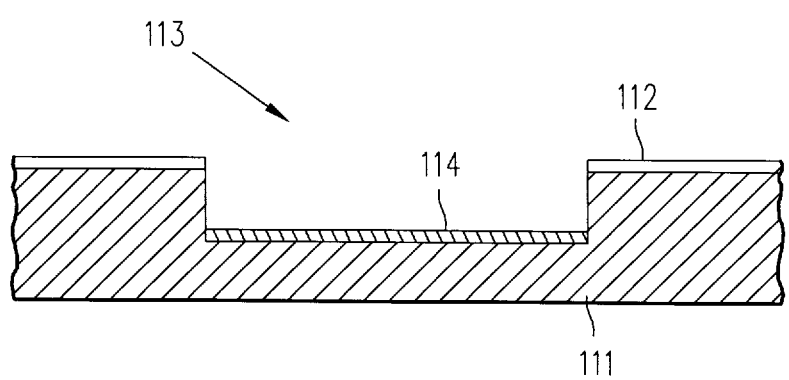
Figure 4C:
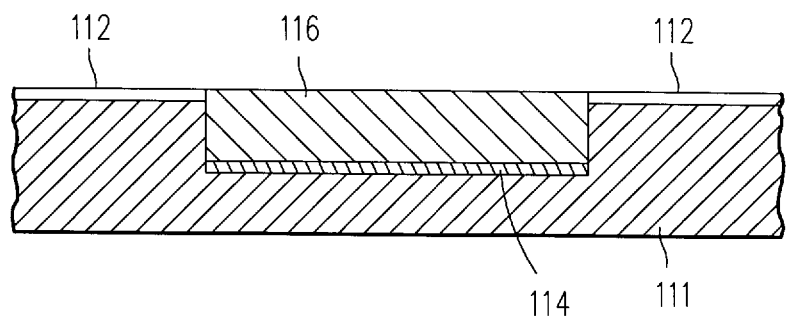

Insulating film 112 and substrate 111 are etched to form a first recess 113 as shown in FIG. 4b. On the entity is deposited a first conductive film 114, which is then selectively etched in such a way that it only remains at the bottom of the first recess 113. By a first electrolysis using conductive film 114 as the electrode, a first magnetic film 116 is deposited which fills the recess 113, said first magnetic film 116 being level with the surface of the first insulating film 112 as shown in FIG. 4c. Thus, said magnetic film is buried or embedded in the substrate.

Figure 4D:
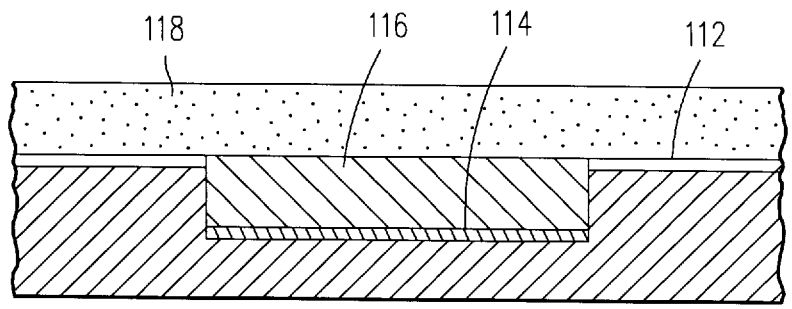
Figure 4E:
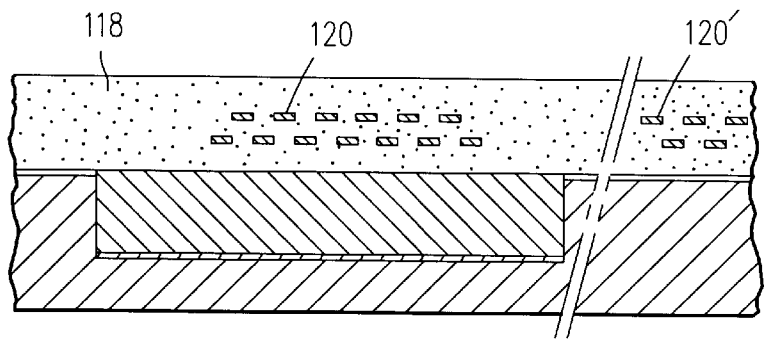
Figure 4F:
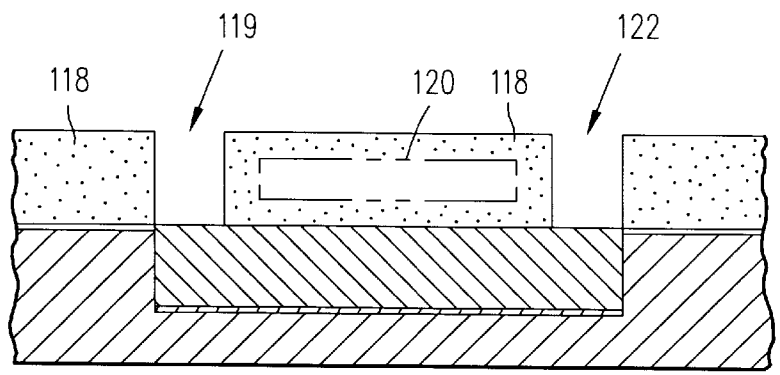

FIG. 4d. illustrates a second insulating film 118 being deposited on the entity. In said second insulating film 118 is formed an electric coil 120 which is illustrated in FIG. 4e. This coil is closed by side parts (only one being shown) 120', which are in the same plane as the central part 120. FIG. 4f.

shows two openings 119, 122, on either side of the coil 120, being etched in the second insulating film 118 and they reach the first magnetic film 116.

Figure 4G:
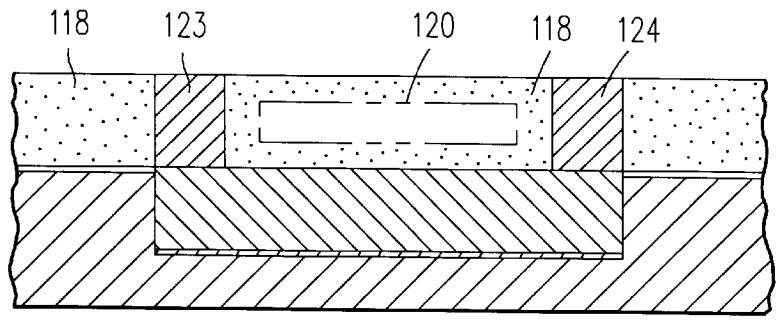
Figure 4H:
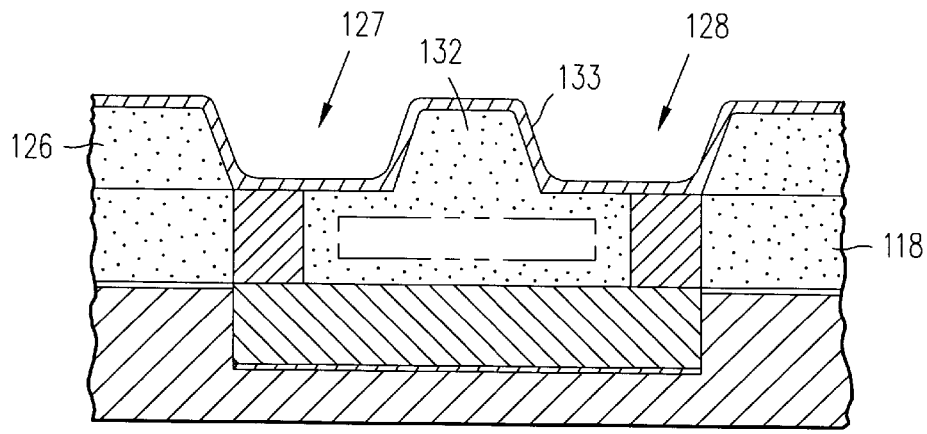

By a second electrolysis using the first conductive film 114 as the electrode, these openings are filled to constitute magnetic contact pads 123, 124, which are in good magnetic continuity with the first magnetic film 116 and are level with the second insulating film 118 as shown in FIG. 4g. On the entity is deposited a third insulating film 126 as shown in FIG. 4h., e.g. of $SiO_2$, $Al_2O_3$, polyimide resin, etc. Second and third recesses 127, 128 are etched in said third insulating film 126 above the magnetic contact pads 123, 124 leaving between the second and third recesses a central insulating island 132 (part h). On the entity is deposited a second conductive film 133, which is then selectively etched so as to only leave it at the bottom of the second and third recesses 127, 128.

Figure 4I:
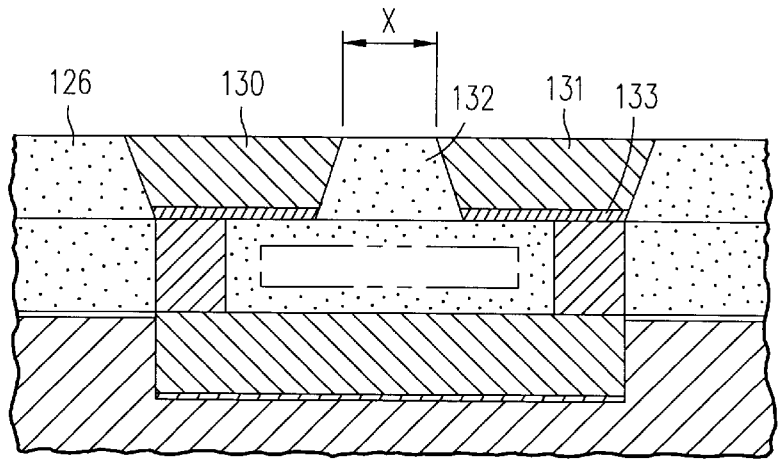
Figure 4J:
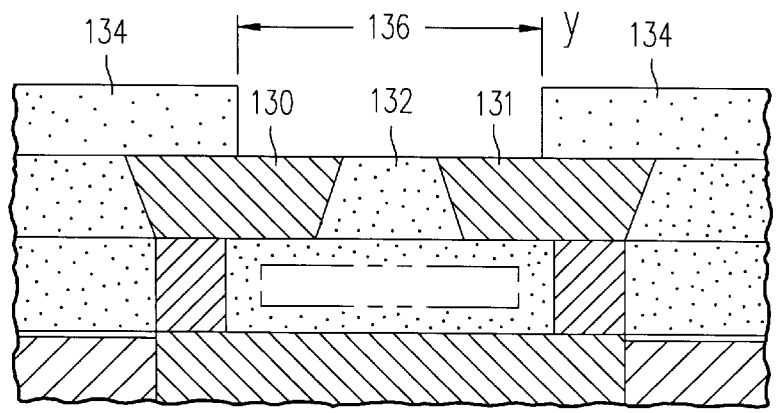
Figure 4K:
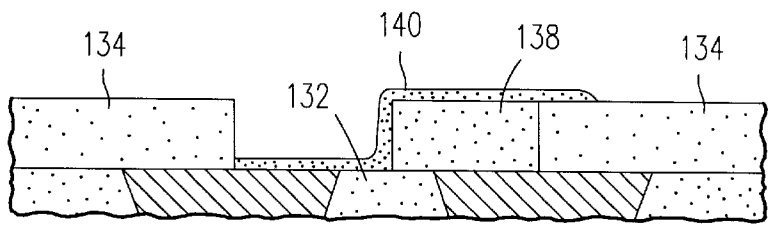
Figure 4L:
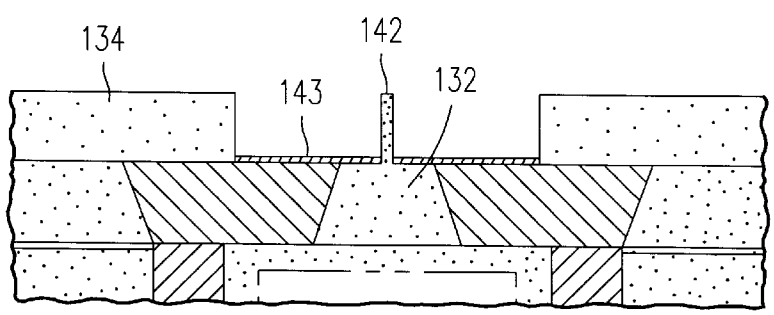

FIG. 4i. illustrates a third electrolysis using the second conductive film 133 as the electrode, wherein the second and third recesses are filled by a second magnetic film subdivided into two parts 130,131 and located on either side of the central insulating island 132, said film being level with the surface of the third insulating film 126. On the entity is deposited a fourth hard protective insulating film 134 as shown in FIG. 4j. In said fourth recess 136 is produced a thin non-magnetic spacer centered on the central insulating island 132. Such a spacer can be obtained in the manner described in the aforementioned European patent application by the deposition of an insulant 138, etching of the latter to give it the shape of a step, deposition of a non-magnetic film 140 as shown in FIG. 4k. etching horizontal portions and maintaining the vertical wall 142 as shown in FIG. 4l. On the entity is deposited a third conductive film 143, which is then selectively etched so as to only leave it at the bottom of the fourth recess 136 on either side of spacer 142.

Figure 4M:
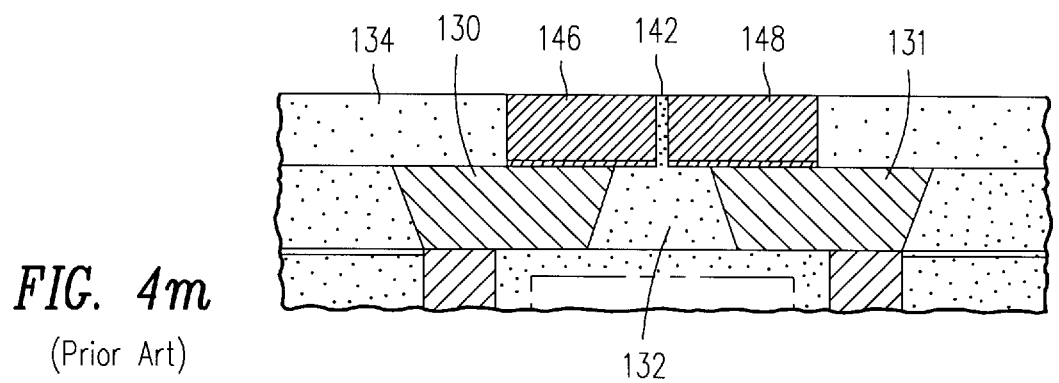

FIG. 4m. illustrates a fourth electrolysis process using the third conductive film 143 as the electrode, wherein the fourth recess 136 is filled by a third magnetic film subdivided into two parts 146, 148 located on either side of non-magnetic spacer 142, said third magnetic film being level with the surface of the hard protective film 134. There is consequently no need to polish the part as in the prior art.

In this process, the conductive films 114, 133, 143 can e.g. be of copper, chromium or tungsten. The magnetic films 116, 123, 124, 130, 131, 146, 148 can be of Fe:Ni in a ratio of e.g. 80:20 in order to obtain a high magnetic permeability. The thickness of magnetic film 116 can be 1 to 5 $\mu$m. The vertical wall 142 can have a width between 0.05 and 1 $\mu$m. The width X of the central contact pad 132 may be between 1 and 5 $\mu$m. The thickness of hard film 134 can be between 1 and 5 $\mu$m. The etching width Y is between 5 and 15 $\mu$m as illustrated in FIG. 4j.

Figure 5A:
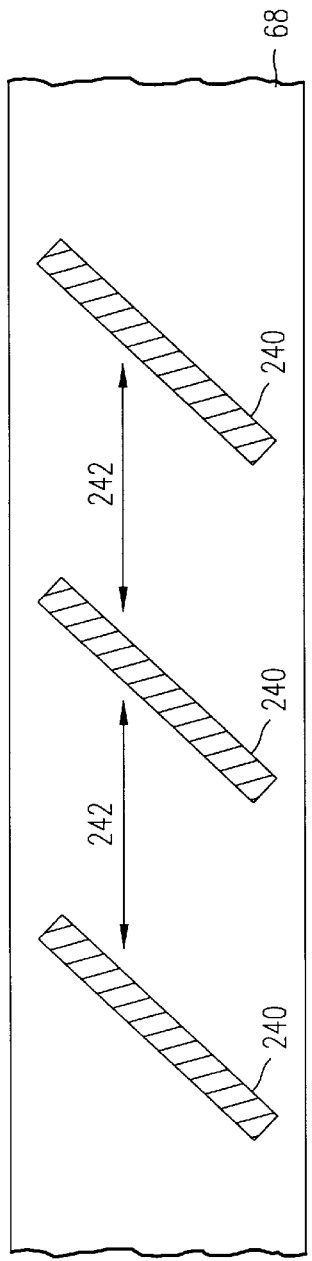
FIG. 5a–c illustrates one embodiment of the fabrication process of the conductive circuit structure with multiple cross-overs of conductive traces on the suspension as shown and described in connection with FIGS. 3a–d.
Figure 5B:
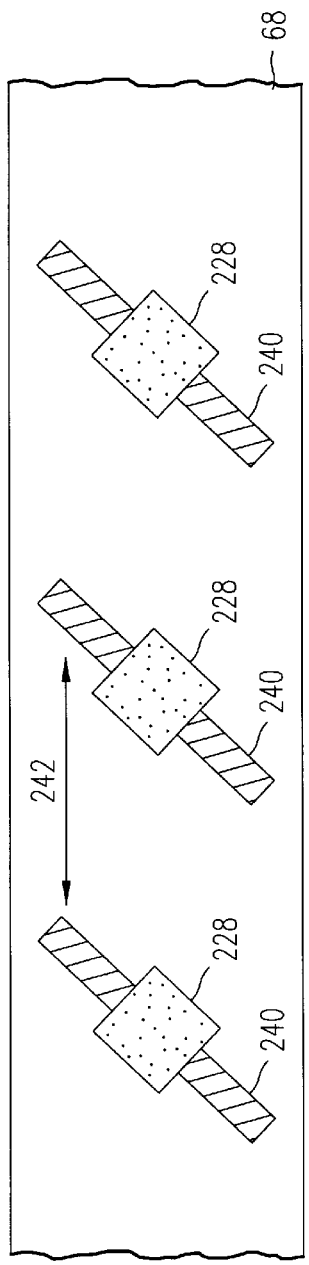
Figure 5C:
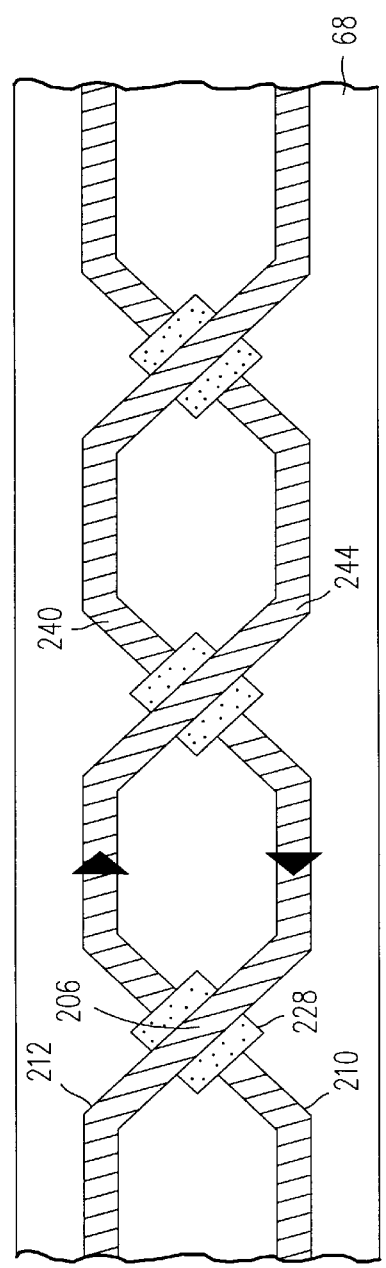

Referring now to FIGS. 5a–5c, the processing for producing the low noise, integrated conductive circuit structure with multiple cross-overs is described. The conductive traces, such as copper or gold, may be fabricated to the head-side or the back-side of the wafer, and the process is applicable for all types of magnetic recording heads such as magnetoresistive and inductive.

FIG. 5a shows a seed layer 240, such as copper, gold or permalloy is deposited on the polysilicon layer 68. Next, a photoresist is applied, exposed, and developed to define the geometry of the conductive traces. In a preferred embodiment, the widths of the conductive traces range from 50–100 microns. The gap 242 between the conductive traces is in the range of 50–100 microns. Next, the conductive material 240 is electroplated to a thickness ranging from 2 to 40 microns. In a preferred embodiment, the conductive material 240 is electroplated to a thickness of 18 microns. The seed layer is removed by known processes such as sputter etching or ion milling.

Continuing now with reference to FIG. 5b, an insulating layer 228 is applied to the first conductive layer 240, to form insulating pockets for the crossed-sections 206. Examples of a suitable insulating layer include hard bake photoresist, alumina, or $SiO_2$. If alumina or $SiO_2$ are used, an additional step such as RIE or chemical etching is required to define the insulating layers 228.

FIG. 5c shows the second conductive layer 244 being formed on the polysilicon layer 68 and crossing the first conductive trace 240. The second conductive trace 244 is formed substantially the same as the first conductive trace 240, as explained in connection with FIG. 5a. A seed layer such as copper, gold or permalloy is deposited on the polysilicon layer 68 of the wafer and the pockets formed by the insulating layer 228. A photoresist is applied, exposed and developed to define the geometry of the second conductive trace 244. Next, the second conductor 244 is electroplated to a thickness in the range of 2 to 40 microns. Preferably, the conductor has a thickness of 18 microns. The seed layer is then removed by processes known in the art such as sputter etching or ion milling.

Optionally, if a protective layer is required, one may be deposited. In one embodiment, a layer of $SiO_2$ may be deposited over the conductive traces 210, 212 by vapor deposition. Alternatively, a protective layer of Alumina may be deposited by sputtering or photoresist. The electrical connection of the traces 210, 212 to the pads at the magnetic head can be made by laser drilling of contact holes (not pictured) in the wafer prior to head or trace fabrication.

With continued reference to FIG. 5c, the conductive traces 210, 212 are vertically separated by the insulating layer 228 by a distance that is small compared to the horizontal separation. In a preferred embodiment, the insulating layer ranges from 2 to 20 microns in thickness. The conductive traces 210, 212, however, are substantially planar because the first conductive trace 212 could be disposed on the same plane as the bottom conductive trace 210 during the parallel sections 230, while being disposed over the insulating layer during the crossed sections.

Referring back to FIG. 2, the alternating pattern of cross 206 and parallel sections 230 of the traces 210, 212 is repeated over the length of the suspension 31. In this manner, the cross 206 and parallel 230 section simulate a twisted pair for reducing noise between the circuits. The magnetic loops in the planar twisted pair line are defined by the closed current paths between the two conductor crossings. The normals to the magnetic loops in the planar twisted-pair like conductive traces 210, 212 are all oriented perpendicular to the transmission line. For a horizontally configured planar line, the normals to the magnetic lines are all aligned vertically, pointing either up or down as determined by the current flow in a particular loop. The resulting transmission line structure, embodying zig-zag line conductive traces effectively to provide a twist of the conductive traces through at least a turn, effects magnetic field cancellation, self shielding and interference suppression. The patterning of conductive traces shown in FIGS. 5a–c illustrates one embodiment of the method of the present invention. A preferred embodiment of this patterning is shown in FIGS. 9f–g, and will subsequently be described.

Figure 6:
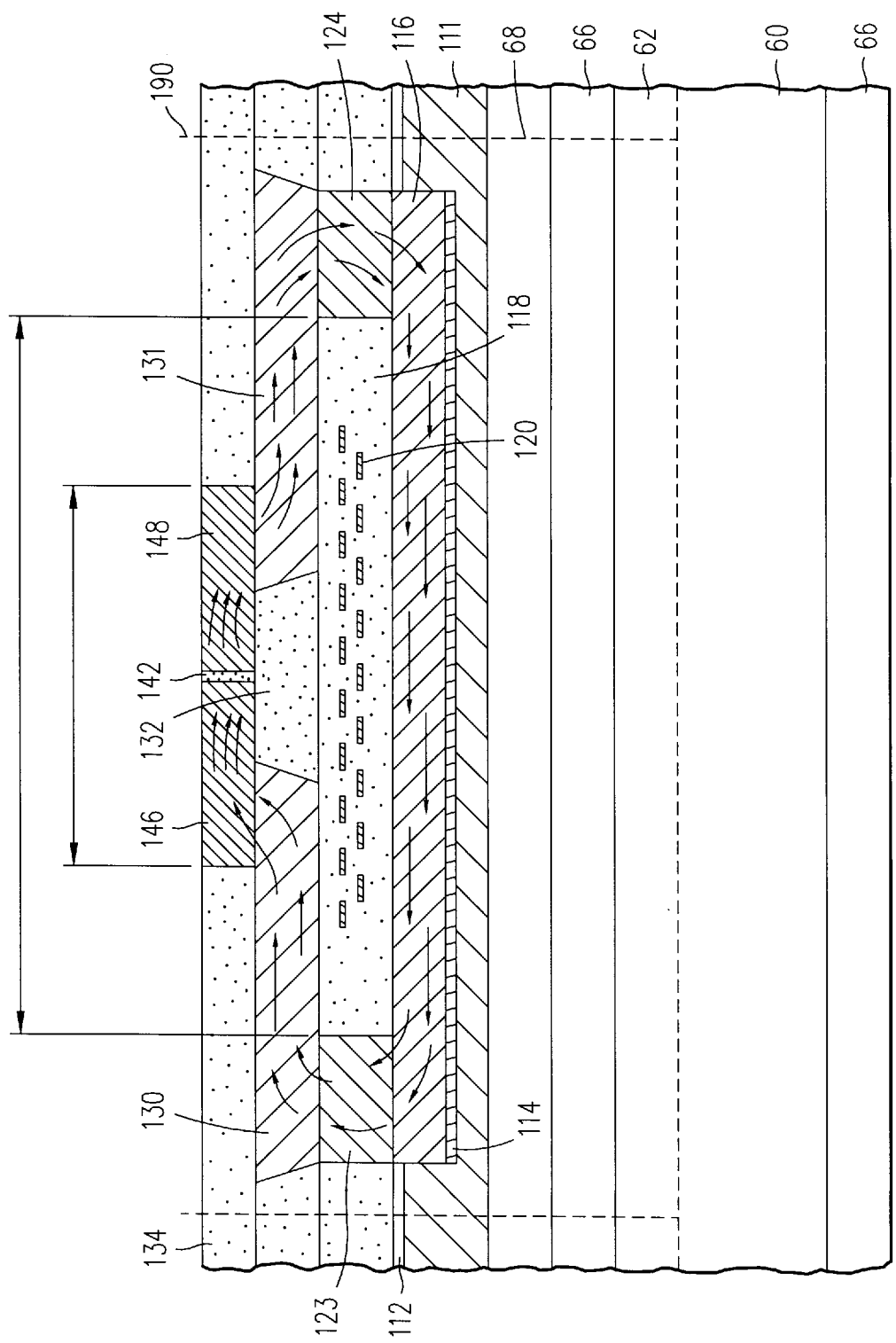
FIG. 6 illustrates one embodiment of a complete head and suspension obtain by the processed as shown and described with reference to FIGS. 3–5.

In a sectional view taken along lines A–A' of FIG. 2, FIG. 6 shows the complete head and suspension obtained by the processed discussed above with reference to FIGS. 3–5. The magnetic field lines make it possible to distinguish the concentration of the flux close to the air gap. After the suspension with integrated crossing traces is fabricated, or suspension/traces and magnetic head is fabricated, the contact hole for the polysilicon is opened for connection to suspension and leads using photoresist and a chemical etchant or reactive ion etching. A trench 190 is created through the silicon wafer by photoresist and a chemical etchant or reactive ion etching is used to define the shape and size of the head and suspension. As previously mentioned, the head and suspension may be defined as one piece or separate pieces.

Figure 7:
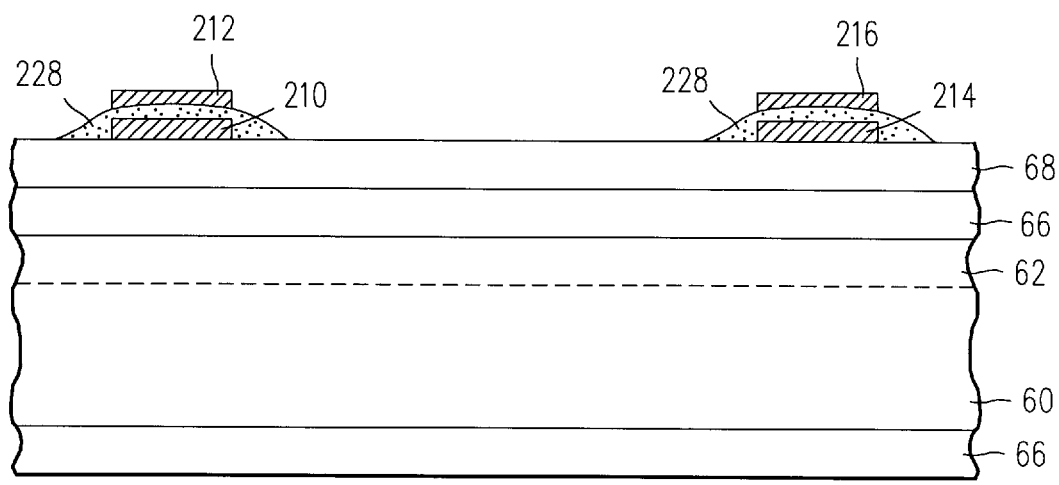
FIG. 7 illustrates one embodiment of a completed head and suspension taken along line B—B' of FIG. 2, showing the crossed leads obtained by the process discussed with reference to FIGS. 3–5.

FIG. 7 shows a sectional view of the complete suspension taken along lines B–B' of FIG. 2, obtained by the processed discussed above with reference to FIGS. 3–5. As seen with reference to FIG. 7, the first conductive traces 210 and 214 are formed on the polysilicon layer 68. Next, the insulating layer 228 is formed on the conductors 210, 214 at the points the conductors are to cross. Lastly, the second conductors 212, 216 are formed such that they overlay the insulating layer 228 at the point the insulating layer 214 overlies the first conductors 210, 218.

Figure 8:
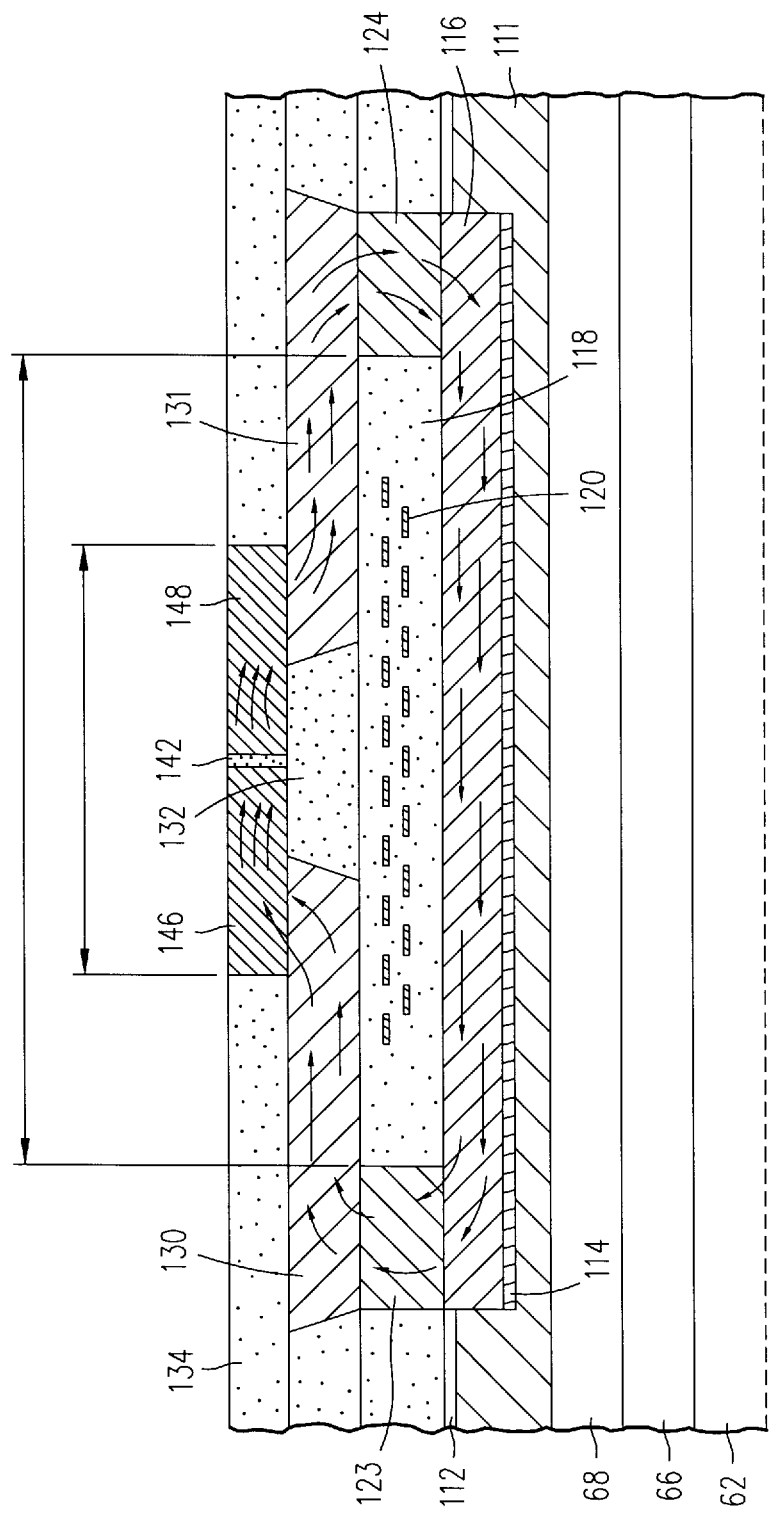
FIG. 8 illustrates a cross-sectional view of the suspension taken along lines A–A' of FIG. 2 after removal of the first silicon oxide layer and the P– silicon wafer.

The head and suspension is then selectively separated from the wafer by removing the first silicon oxide layer (backside) by a chemical etchant, and the P− silicon wafer by selective etching such as pyrotechatechol (directional etchant) as shown in FIG. 8. This then leaves the N+ silicon layer 62 intact. Finally, the suspended magnetic recording heads and suspensions may be collected.

An alternative embodiment of the invention, as illustrated in FIGS. 9*a*–*f*, fabricates the conductive traces on the suspension at the same time the coil windings are formed in the magnetic head. As was previously shown and described in connection with FIGS. 3*a*–*d*, a P− silicon wafer 60 is doped with N+ 62 by an implantation or out-diffusion of a doped glass, thereby resulting in a doped silicon wafer 64. The doped silicon wafer 64 is then thermally oxidized to generate a silicon oxide layer 66 on both sides of the wafer 64 and to drive N+ dopant 62 into the wafer to the desired thickness of the suspension. Alternatively, the wafer 64 as shown in FIG. 3*b* may be annealed after oxidation.

Polysilicon, doped polysilicon or a suicide layer 68 of about 1 micron thickness is deposited over the silicon oxide layer 66 using low pressure chemical vapor deposition (PLCUD), chemical vapor deposition (CVD) or other similar semi conductor deposition processes. The polysilicon 68 is patterned using photoresist and a chemical etchant or reactive on etching to define head structure and suspension structure as one piece or as separate pieces, and for contact to holes and leads.

Figure 9A:
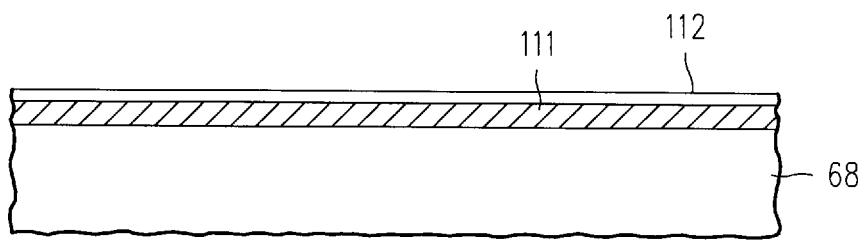
FIGS. 9a–g illustrate an alternative embodiment of the present invention wherein the conductive traces are formed at coil formation time in the magnetic head.
Figure 9B:
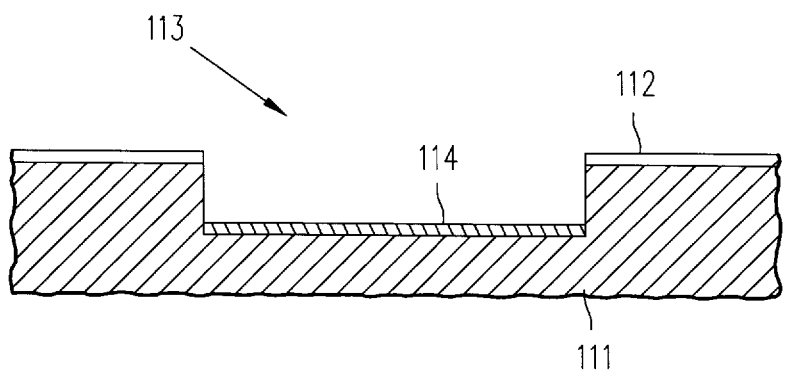
Figure 9C:
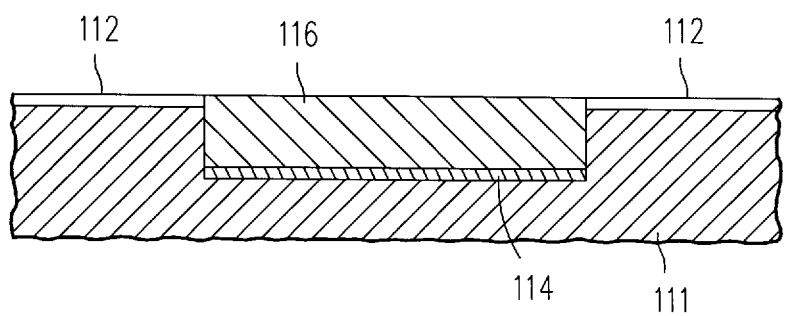
Figure 9D:
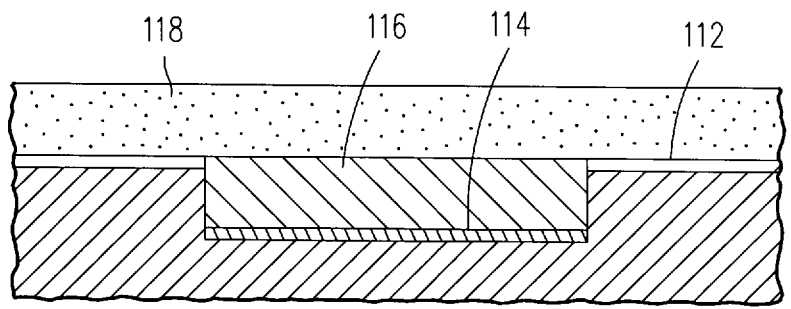
Figure 9E:
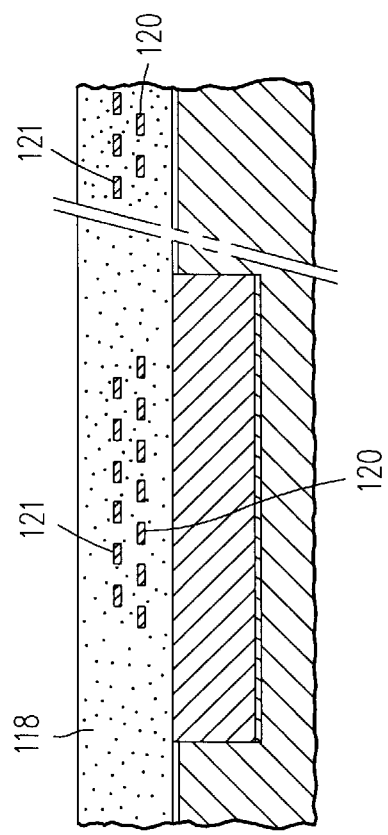
Figure 9F:
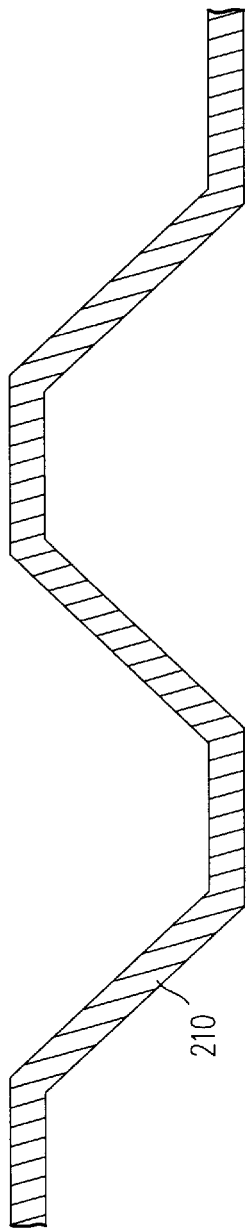
Figure 9G:
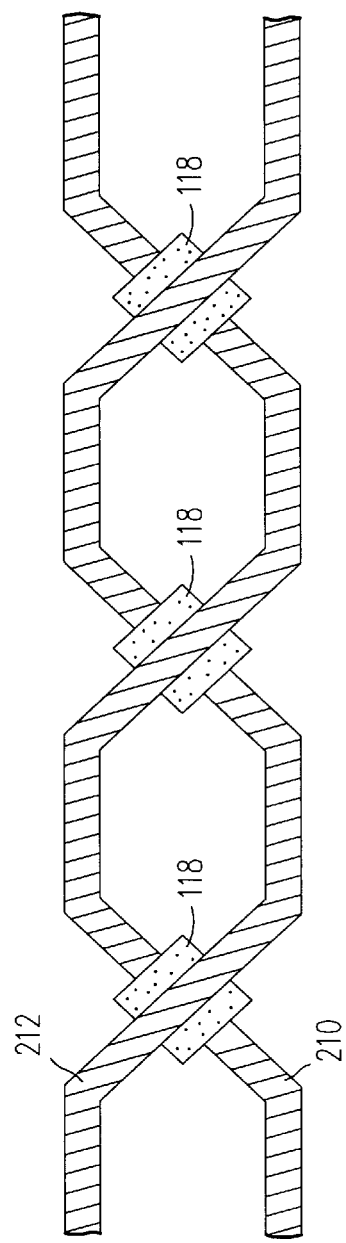

Referring now to FIGS. 9*a*–*g*, the fabrication of conductive traces concurrent with the magnetic head coil windings is described with reference to FIG. 9*a*, on the polysilicon layer shown in FIG. 3*d*, a silicon dioxide layer 111 is deposited or grown and thereon is formed a first insulating film 112. First insulating film 112 may be, for example, silicon oxide. The insulating film 112 and substrate 111 are etched to form a first recess 113 as shown in FIG. 9*b*. On the entity is deposited a first conductive film 114, which is then selectively etched in such a way that it only remains at the bottom of the first recess 113. By a first electrolysis using conductive film 114 as the electrode, a first magnetic film is deposited which fills the recess 113, said first magnetic film 116 being level with the surface of the first insulating film 112 as shown in FIG. 9*c*. Thus, the magnetic film is buried or embedded in the substrate.

FIG. 9*d* illustrates a second insulating film 118 being deposited on the entity. In that insulating film 118 is formed an electric coil, 120, 121, and conductive traces 210, 212. The coil windings 120, 121, as shown in FIG. 9*e*, and conductive traces 210, 212 as shown in FIGS. 9*f*–*g* are formed of copper (Cu) or gold (Au), for example by plating techniques. The manufacturability of integrated head suspension assemblies using this technique is greatly simplified due to the elimination of various processes to fabricate the conductive leads on the suspension separate from the head. As first coil winding 120 is fabricated in the insulating layer 118 of the magnetic head, the first conductive trace 210 is formed along the body of the suspension by the process as previously shown in connection with FIG. 5*a*. Next, as the second coil winding 121 is formed in the insulating layer 118. An insulating layer 118 is then deposited over the first coil winding 120 and first conductive trace 210. The second conductive trace 212 is fabricated on the body of the suspension. The remainder of the magnetic head is then formed substantially as described in connection with FIGS. 4*f*–*m*.

In this embodiment, it can be seen that the conductive traces 210, 212 are fabricated along the length of the suspension in a zig-zag pattern, separated by insulating layer 118 deposited over the suspension and the head. In accordance with this embodiment, conductive traces 210, 212 are limited in thickness to that of the first 120 and second 121 coil windings respectively. However, the width may be controlled to reduce the resistance and control the noise. In a preferred embodiment the thickness of the insulating layer is in the range of 2–20 microns, although the thickness is preferably about 3 microns.

Figure 11:
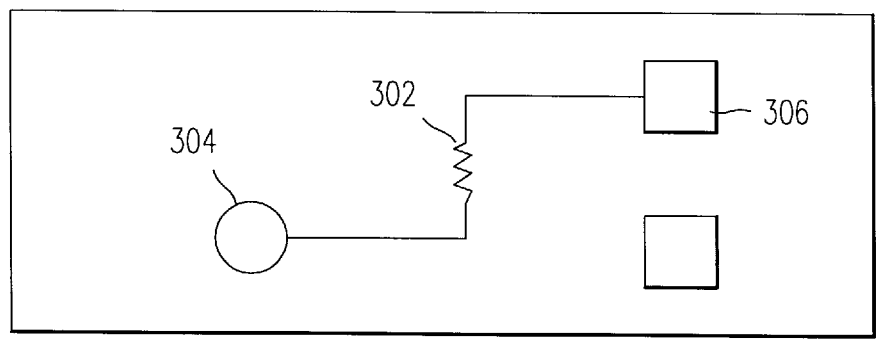
FIG. 11 illustrates the formation of an ESD barrier between the leads of the integral head and suspension according to the present invention.
Figure 10:
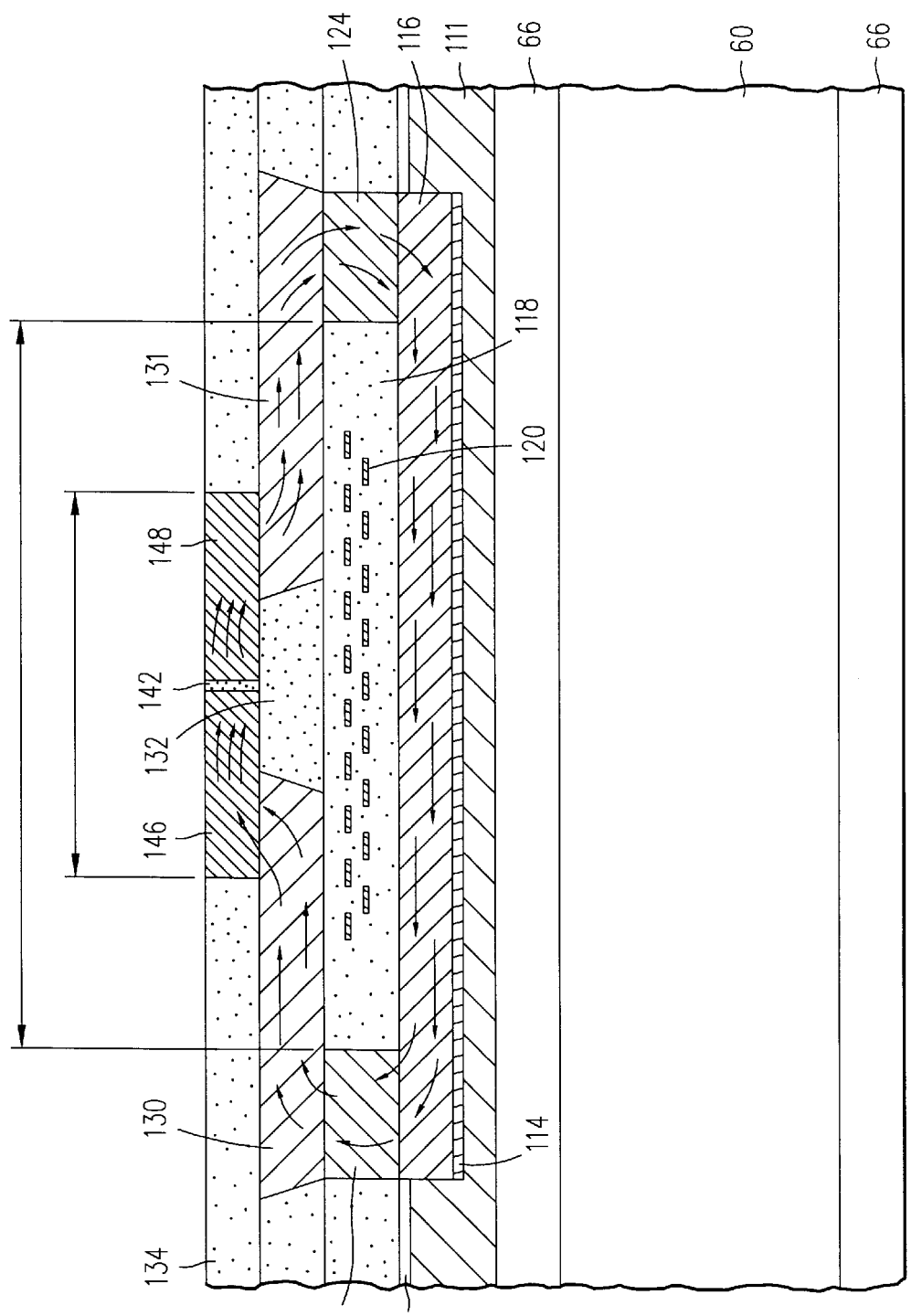
FIG. 10 illustrates a second embodiment of the present invention wherein a low mass magnetic recording head and suspension uses the silicon dioxide matrix for the suspension thereby allowing the elimination of the N+ Si layer and pattern steps.

A second alternative embodiment of the invention, as illustrated in FIG. 10, uses the silicon dioxide matrix for the suspension thereby allowing the elimination of the N+ Si layer and pattern steps. Further options that may be implemented without departing from the invention include using N+ Si as a shield for electrical noise. Polysilicon may also be used to form a resistor 302 (or diode) for ESD protection, and can be placed between the polysilicon pads 306 and pole piece 304 as shown in FIG. 11. Further, multiple leads can be defined for inductive, magnetoresistive or dual head structures. In addition, materials of different thermal expansion coefficients can be deposited on specific locations on the suspension 31 to adjust the gram load of the suspension 31. Alternatively, grooves may be etched into the suspension 31 to vary the gram load of the suspension.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A method of fabricating an integral magnetic recording head suspension, comprising the steps of:

creating a P− silicon wafer having a top side and a bottom side;

doping the P− silicon wafer with N+ on the top side to obtain a doped silicon wafer;

thermally oxidizing the doped silicon wafer to generate a silicon oxide layer on both sides of the wafer;

depositing polysilicon over the top silicon oxide layer;

depositing a first seed layer over the polysilicon layer;

patterning the seed layer using photoresist and etching techniques to define a first conductive trace having a straight portion and an angled portion;

electroplating the first seed layer to a desired thickness;

depositing an insulating layer at selective points on the angled portion of the first conductive trace;

removing the first seed layer;

depositing a second seed layer over the polysilicon layer and the insulating layer;

patterning the second seed layer using photoresist and etching techniques to define a second conductive trace having a straight portion and an angled portion; the angled portion of the second conductive trace crossing the insulating layer disposed on the first conductive trace;

electroplating the second seed layer to a desired thickness;

removing the second seed layer;

creating a trench through the silicon wafer;

defining the size and shape of the suspension by etching; and selectively separating the suspension from the wafer by removing the bottom silicon oxide layer by a chemical etchant, and the P– silicon wafer by selective etching.

2. The method of claim 1, wherein the first seed layer is removed by sputter etching.

3. The method of claim 1, wherein the second seed layer is removed by sputter etching.

4. The method of claim 1, wherein the first seed layer is removed by ion milling.

5. The method of claim 1, wherein the second seed layer is removed by ion milling.

6. The method of claim 1, wherein the seed layer is comprised of copper.

7. The method of claim 1, wherein the insulating layer is a polyimide.

8. The method of claim 1, further comprising applying a protective layer over the first conductive trace and the second conductive trace on the suspension.

9. The method of claim 8, wherein the protective layer is $SiO_2$ which is deposited by vapor deposition.

10. The method of claim 8, wherein the protective layer is Alumina which is deposited by sputtering.

11. The method of claim 1 wherein the doping of the P– silicon wafer with N+ on the top side to obtain a doped silicon wafer is performed by ion implantation.

12. The method of claim 1 wherein the doping of the P– silicon wafer with N+ on the top side to obtain a doped silicon wafer is performed out-diffusion of a doped glass.

13. The method of claim 1 wherein the step of thermally oxidizing the doped silicon wafer further comprises the step of driving the N+ dopant into the wafer to the desired thickness of the suspension.

14. The method of claim 1 wherein the step of thermally oxidizing the doped silicon wafer further comprises the step of annealing the doped wafer after oxidation.

15. The method of claim 1 wherein the polysilicon is doped polysilicon.

16. The method of claim 1 wherein the step of depositing polysilicon over the top silicon oxide layer is performed by low pressure chemical vapor deposition (LPCVD).

17. The method of claim 1 wherein the step of depositing polysilicon over the top silicon oxide layer is performed by chemical vapor deposition (CVD).

18. The method of claim 1 wherein the step of creating a trench through the silicon wafer is performed by photoresist.

19. The method of claim 1 wherein the step of selectively separating the head from the wafer by removing the P– silicon wafer by selective etching further comprises using pyrotechatechol.

20. The method of claim 1, further comprising constructing a magnetic head over the polysilicon layer such that the magnetic head and the suspension are integrally formed as one piece.

21. The method of claim 20 wherein the step of producing a magnetic head further comprises the steps of:

forming a first insulating film on an insulating substrate;

etching the insulating film and the substrate to form a first recess;

depositing thereon a first conductive film, which is then selectively etched in such a way that it only remains at the bottom of the first recess;

depositing a first magnetic film by a first electrolysis taking the conductive film as the electrode so that said first magnetic film fills the recess and is level with the surface of the first insulating film;

depositing a second insulating film thereon wherein an electric coil is formed in said second insulating film;

etching in the second insulating film, on either side of the coil, two openings reaching the first magnetic film;

filling said openings by a second electrolysis using the first conductive film as the electrode, to thereby produce magnetic contact pads, which have a good magnetic continuity with the first magnetic film and are level with the surface of the second insulating film;

depositing thereon a third insulating film;

etching in said third insulating film, above the magnetic contact pads, second and third recesses, leaving between said second and third recesses a central insulating island;

depositing thereon a second conductive film, which is then selectively etched so as to leave it at the bottom of the second and third recesses;

filling the second and third recesses with a second magnetic film subdivided into two parts and located on either side of the central insulating island, said second magnetic film being level with the surface of the third insulating film, by a third electrolysis using the second conductive film as the electrode;

depositing thereon a fourth hard protective insulating film, into which is etched a fourth recess above the central insulating island and reaching the second magnetic film;

forming in said fourth recess a thin non-magnetic spacer centered on the central insulating island;

depositing thereon a third conductive film, which is then selectively etched so as to only leave it at the bottom of the fourth recess on either side of the spacer; and filling the fourth recess with a third magnetic film subdivided into two parts located on either side of the non-magnetic spacer, said third magnetic film being level with the surface of the hard protective film, by a fourth electrolysis using the third conductive film as the electrode.

22. The method of claim 21 wherein the insulating substrate comprises a silicon layer deposited or grown on the polysilicon substrate.

23. The method of claim 21 wherein the magnetic head comprises an insulating substrate, a first magnetic film buried in the substrate and level with the surface thereof, two magnetic contact pads resting at the two ends of the first magnetic film, an electric coil located in an insulating film and surrounding the two contact pads, an insulating island positioned above the central part of the coil, a second magnetic film subdivided into two portions by the insulating contact pad and a third magnetic film subdivided into two parts resting on the two portions of the second magnetic film, said two portions being separated by a non-magnetic spacer, said third film being buried in a hard protective insulating film.

* * * * *